Figure 1:
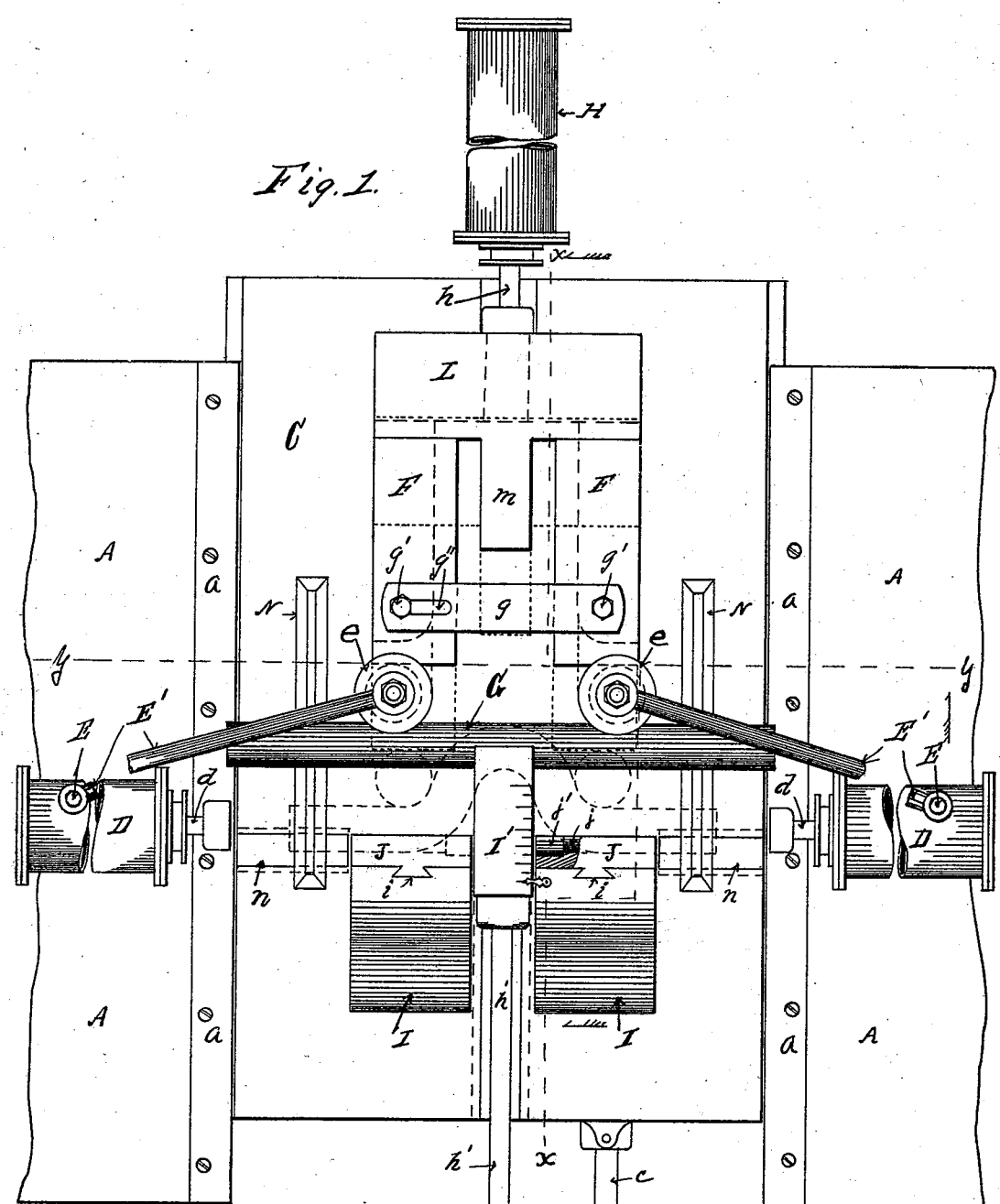

(No Model.) 4 Sheets—Sheet 1.

E. THOMAS & T. L. FITZGERALD.
MECHANISM FOR MAKING CRANK SHAFTS.

No. 510,103. Patented Dec. 5, 1893.

WITNESSES
F. J. Bassett
F. Einfeldt

INVENTORS
Edmund Thomas
Thomas L. Fitzgerald
By Musgrove
Atty.

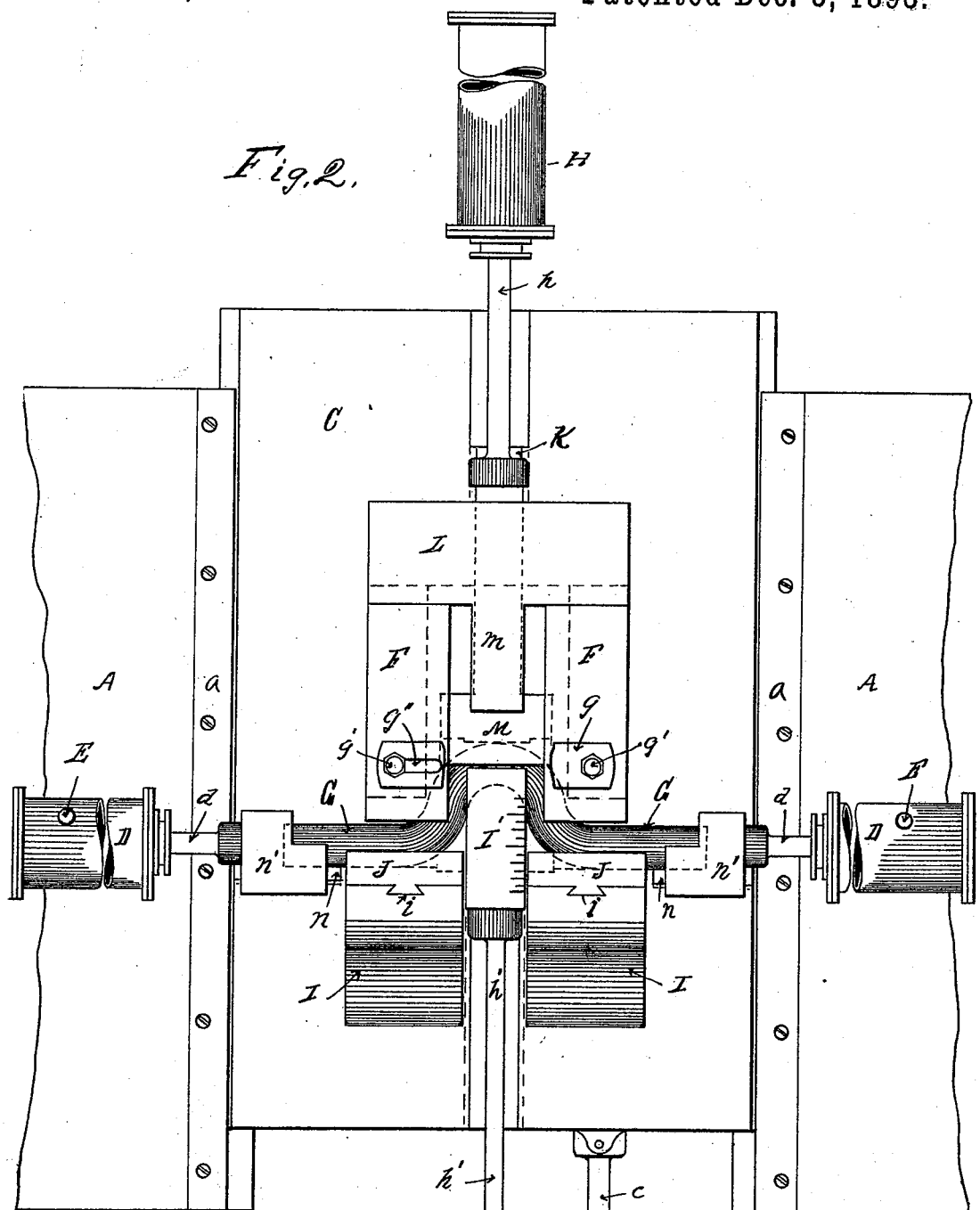

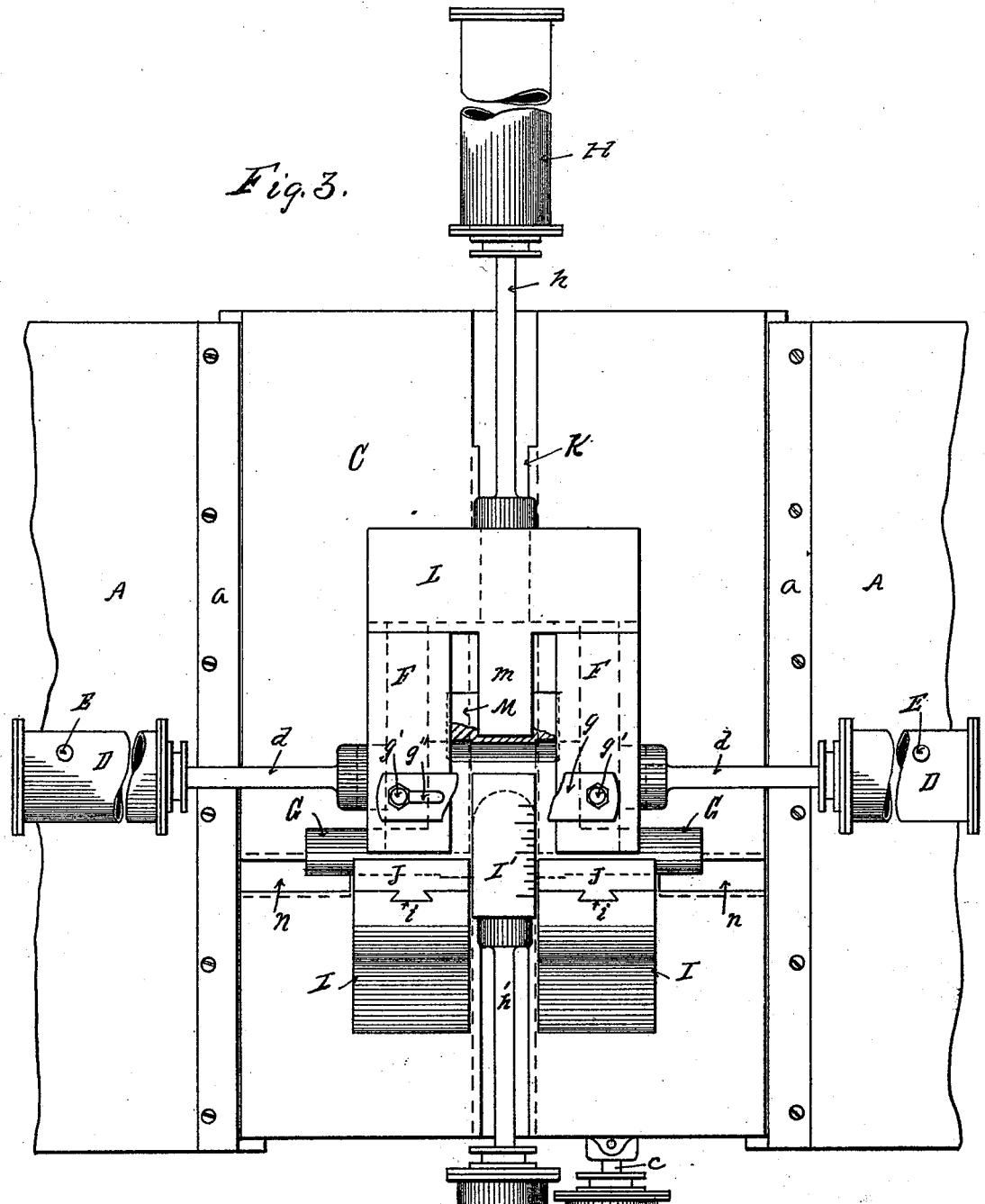

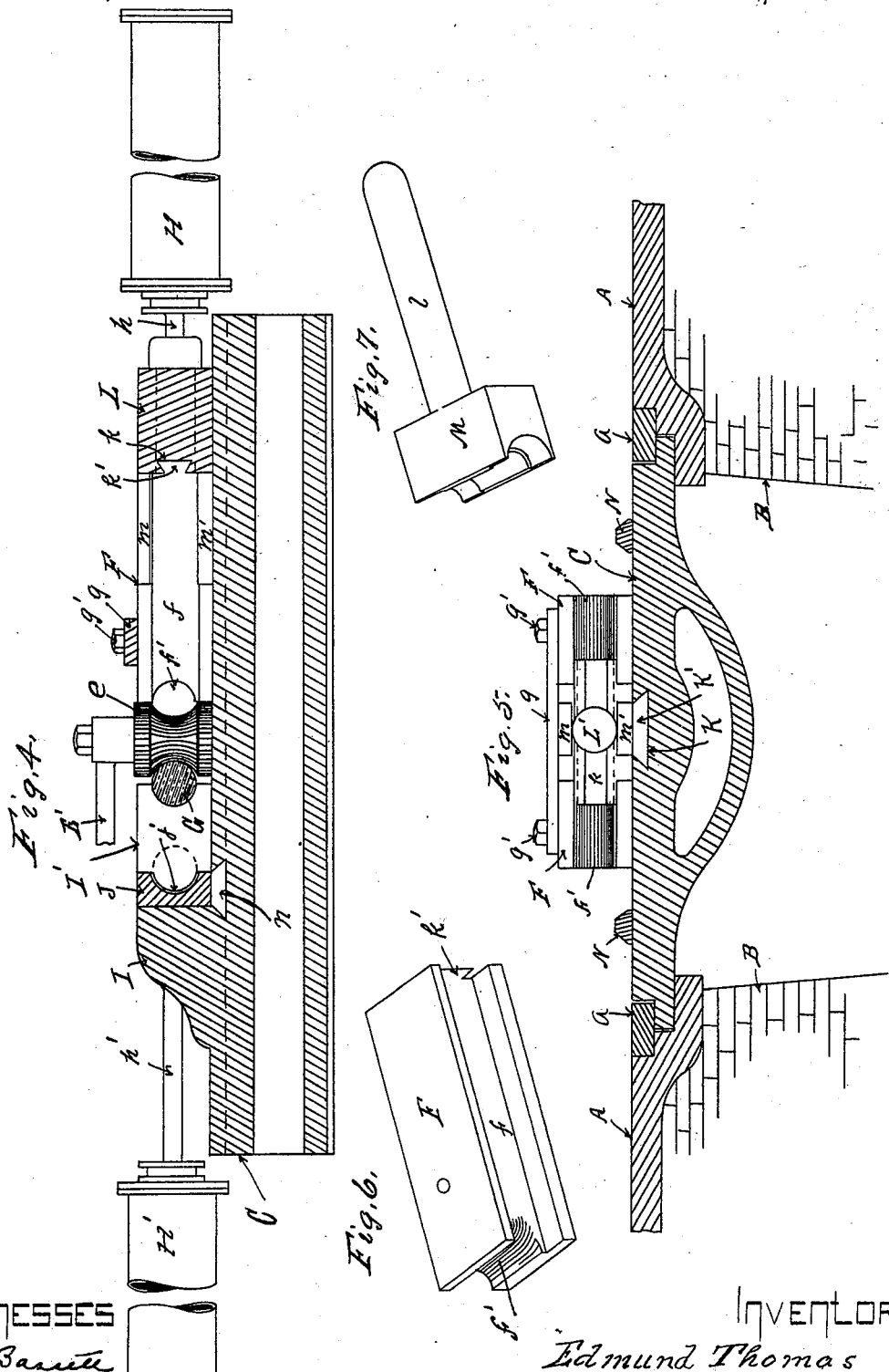

UNITED STATES PATENT OFFICE.

EDMUND THOMAS AND THOMAS L. FITZGERALD, OF ERIE, PENNSYLVANIA.

MECHANISM FOR MAKING CRANK-SHAFTS.

SPECIFICATION forming part of Letters Patent No. 510,103, dated December 5, 1893.

Application filed June 28, 1893. Serial No. 479,078. (No model.)

*To all whom it may concern:*

Be it known that we, EDMUND THOMAS and THOMAS L. FITZGERALD, citizens of the United States, residing at the city of Erie, in the county of Erie and State of Pennsylvania, have invented certain new and useful Improvements in Mechanism for Making Crank-Shafts; and we do hereby declare the following to be a full, clear, and exact description of the invention, such as will enable others skilled in the art to which it appertains to make and use the same, reference being had to the accompanying drawings, and to the letters of reference marked thereon, forming part of this specification.

Our invention consists in the improvements in mechanism for making crank shafts, hereinafter set forth and explained, and illustrated in the accompanying drawings.

Heretofore in making crank shafts, great difficulty has been experienced in the stretching of the rod or shaft during the process of bending the same, so that there was insufficient metal left in the crank pin and arms of the crank when completed. We overcome these difficulties in the following manner: We first bend the heated rod or shaft around a central die, which can be moved forward or back as desired, according to the throw of the crank to be made; during this part of the operation, the central die is set forward, so that the arms of the crank are bent somewhat longer than it is desired to have them when the crank is finished; after the first bend is made, the central die is set back until it only projects a distance equal to the length it is desired to make the finished crank arms; hydraulic pistons or other convenient means for producing pressure are then applied to the ends of the rod or shaft, so as to force it toward the central die, and at the same time a wrist-pin die is brought down upon the portion of the crank designed for the wrist-pin, so as to force it downward upon the end of the central die, which steps operate to upset the arms of the crank, and at the same time shorten the bends therein at the points where the crank arms start out from the rod or shaft. Laterally movable side dies are then brought down upon the rod or shaft at the sides of the arms of the partially finished crank, and hydraulic or other convenient pressure applied thereto, both laterally and longitudinally which operates to compress the surplus metal forced into the crank arms by the upsetting process hereinbefore described into the dies, so as to square out the corners of the arms of the crank and complete it.

The mechanism which we use in making crank shafts is illustrated in the accompanying drawings, in which—

Figure 1. is a top or plan view of our improved mechanism for making cranks as it appears with a rod or shaft therein ready to be bent, the sides of the frame and parts of the mechanism being broken away. Fig. 2. is a like top or plan view of said mechanism during that portion in which the upsetting of the metal in the arms of the crank is done. Fig. 3. is a like view of the same during the last or finishing step in making the crank. Fig. 4. is a vertical longitudinal section of said mechanism on the line $x\ x$ in Fig. 1, looking in the direction of the arrow. Fig. 5. is a vertical transverse section of the same on the line $y\ y$ in Fig. 1, looking in the direction of the arrow. Fig. 6. is a perspective view of one of the dies used in said machine. Fig. 7. is a perspective view of the crank-pin die used in said machine.

Referring to the drawings A A are the side frames of the machine; these side frames being firmly secured to foundations B B; the inside faces of these side frames are provided with slides or ways $a\ a$ in which the edges of the table C, filling the space between said side frames, slide. To the side frames are also secured hydraulic cylinders D D operating piston rods $d\ d$ as and for the purposes hereinafter set forth.

On the cylinders D D are upright studs E E upon which are pivoted arms E' E' which are provided with friction rollers $e\ e$, which operate between the ends of dies F F and the rod or shaft G during the first step in making the crank; these arms serving to guide the traverse of said rollers $e\ e$ during the bending of the rod or shaft into the shape illustrated in Fig. 2, after which the dies F F are moved back and the arms E' E' lifted off the studs E E and laid aside.

At each end of the sliding table C are hydraulic cylinders H and H' adapted to operate piston rods $h$ and $h'$ as and for the purpose hereinafter set forth. At one end of the table C is another hydraulic cylinder C' which operates a piston rod $c$ by means of which the table C is moved and held in any desired position; these three cylinders are mounted preferably on substantial foundations (not shown) in the usual manner.

On one end of the table C are upright projections I I between which a central die I' is operated by means of the piston rod $h'$; in dovetail grooves $i\ i$ in the ends of the projections I I are secured dies J J having circular recesses $j\ j'$ in the faces thereof to receive the rod or shaft and form up a portion of the bends of the crank, as hereinafter described; these dies are adapted to be removed and replaced by others, according to the size of the rod or shaft used in making the crank. In the opposite end of the table C is a longitudinal dovetail slot K in which a dovetail rib K' on a transverse block L moves longitudinally. In the face of this block L is a dovetail groove $k$ in which projections $k'$ on the ends of the dies F F fit, so that the dies F F will move transversely to and from each other therein, and at the same time move longitudinally in unison with the block L. Through the center of the block L is an opening L' through which the stem $l$ of a wrist-pin die M moves longitudinally, and on the face of the block L and projecting longitudinally therefrom above and below the opening L' therein are guides $m$ and $m'$ between which the wrist-pin die M travels. The inner face of the dies F F are also provided with longitudinal recesses $f f$ within which the ends of the wrist-pin die M slide longitudinally, and which also operate as dies for forming up the sides of the crank; semi-circular recesses $f'$ $f'$ are also formed in the ends of the dies F F corresponding with the recesses $j j$ in the dies J J.

Across the outer ends of the dies F F is a strap or bar $g$ secured to said dies by means of bolts $g'\ g'$. One end of this strap or bar is provided with a slot $g''$ adapted to slide on one of the bolts $g'$ so that while the said strap or bar $g$ operates to limit the outward movement of the dies F F, the said slot $g''$ allows them to be moved toward each other the length of said slot, as and for the purpose hereinafter set forth. Removable rest bars N N are also provided, which are laid loosely upon the table C, as illustrated in Fig. 1, to support the rod or shaft during the first step in the process, and transverse slots $n\ n$ are also provided in the table C in which removable guide blocks $n'\ n'$ are secured to support the ends of the rod or shaft during the second step in the process, as illustrated in Fig. 2.

In making a crank, the rod or shaft G is first heated to the proper heat, at the point where it is desired to make the crank therein, and then laid upon the rests N N in front of the central die I'. The friction rollers $e\ e$ are then placed in position and the dies F F are then moved forward until the rod or shaft G is bent into the shape illustrated in Fig. 2. The dies F F are then moved back and the friction rollers $e\ e$ removed; the central die I' is then moved back to the proper distance for the length of the crank to be made, and the wrist-pin die M placed in position, and the dies F F moved forward to approximately the position illustrated in Fig. 2. Pressure is then simultaneously applied to the wrist-pin die M and to the ends of the rod or shaft G which operate to compress the bends in the rod or shaft against the central die I' and at the same time upset the arms of the crank the amount required. The table C is then moved so that the piston rods $d\ d$ will contact with the sides of the dies F F which are then forced together, and endwise by the piston rod $h$ until they contact with the sides of the central die I' and with the faces of the dies J J, the commencement of this feature of the process being illustrated in Fig. 3.

In the drawings we have illustrated and have hereinbefore described convenient mechanism for making crank shafts, but we do not desire to be limited to the exact construction of mechanism shown and described.

Therefore what we claim as new, and desire to secure by Letters Patent of the United States, is—

1. The combination in a machine for making crank shafts, of a sliding table, stationary dies and also movable dies operating thereon, and mechanism for moving said table and for moving the dies thereon, substantially as and for the purpose set forth.

2. The combination in a machine, for making crank shafts, of a sliding table, a hydraulic cylinder operating to move said table, and hold it in any desired position, movable dies on said table, and hydraulic cylinder mechanism communicating with and operating the dies on said table, substantially as and for the purpose set forth.

3. The combination in a machine for making crank shafts, of a movable table, stationary dies as J J thereon, an adjustable central die as I, a movable wrist-pin die as M, and movable side dies as F F, and mechanism for applying pressure to said movable dies, substantially as and for the purpose set forth.

4. The combination in a machine for making crank shafts, of a table sliding longitudinally in grooves in the machine frame, a hydraulic press for moving said table and holding it in any desired position, a movable central die I' operated by a hydraulic press H', and removable dies J, J secured to said table at each side of the movable central die I'; substantially as and for the purpose set forth.

5. The combination in a machine for making crank shafts, of a movable table, a mechanism for moving said table, a central die I' movable on said table, a hydraulic press H' moving said die I' on said table, dies F, F, mounted and laterally movable in a supporting block L moving longitudinally on said table, a hydraulic press H adapted to move the block L and the laterally movable dies F, F carried thereby longitudinally, and hydraulic presses D, D, adapted to engage the dies F, F and move them laterally toward the central die I; substantially as and for the purpose set forth.

6. The combination in a machine for making crank shafts, of a longitudinally movable table, mechanism for moving said table longitudinally, a block L adapted to be moved longitudinally on said table, a wrist-pin-die M adapted to be moved longitudinally in the block L, a hydraulic press H adapted to move both the block L and the die M therein, the laterally movable dies F, F, and the hydraulic presses D, D, substantially as and for the purpose set forth.

7. The combination in a machine for making crank shafts, of a longitudinally movable table C, a hydraulic press C' adapted to move said table longitudinally in its supporting frame, a movable central die I' on said table, a hydraulic press H' for moving said die, interchangeable dies J. J. secured in fixed supports I, I on said table at each side of the movable central die I', a longitudinally moving block L and wrist-pin-die M therein, a hydraulic press H for moving said block and die longitudinally on the table C, laterally movable dies mounted in the longitudinally moving block L, laterally operating hydraulic presses D, D, adapted to operate alternately on the ends of the shaft being bent, and on the sides of the laterally movable dies F, F, removable arms E' E' pivoted at the sides of the machine frame, and friction rollers e, e, on the ends of said arms; substantially as and for the purpose set forth.

In testimony whereof we affix our signatures in presence of two witnesses.

EDMUND THOMAS.
THOMAS L. FITZGERALD.

Witnesses:
RALPH A. STURGEON,
L. D. HANFORD.